(12) United States Patent
Lee et al.

(10) Patent No.: US 6,356,745 B1
(45) Date of Patent: Mar. 12, 2002

(54) DEVICE AND METHOD FOR CONTROLLING OUTPUT POWER OF MOBILE COMMUNICATION TERMINAL

(75) Inventors: Woo-Yong Lee; Jae-Min Lee, both of Songnam-shi; Seung-Ki Cho, Seoul; Sung-Taek Kwon, Songnam-shi, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/338,791

(22) Filed: Jun. 23, 1999

(30) Foreign Application Priority Data

Jun. 23, 1998 (KR) .............................. 98-23776

(51) Int. Cl.[7] .......................... H01Q 11/12; H04B 1/06; H04B 7/00; H04L 27/08; H03G 3/20
(52) U.S. Cl. ................. 455/232.1; 455/127; 455/234.1; 455/251.1; 455/522; 375/345; 330/129
(58) Field of Search ............................ 455/127, 232.1, 455/234.1, 251.1, 522; 375/345; 330/129

(56) References Cited

U.S. PATENT DOCUMENTS

| | | | | |
|---|---|---|---|---|
| 5,101,173 A | * | 3/1992 | DiPiazza et al. | 330/136 |
| 5,136,257 A | * | 8/1992 | Reading | 330/129 |
| 5,559,471 A | * | 9/1996 | Black | 330/277 |
| 5,933,455 A | * | 8/1999 | Hendrickson et al. | 375/261 |
| 6,134,430 A | * | 10/2000 | Younis et al. | 455/340 |

* cited by examiner

*Primary Examiner*—Thanh Cong Le
*Assistant Examiner*—Meless Zewdu
(74) *Attorney, Agent, or Firm*—Dilworth & Barrese, LLP

(57) ABSTRACT

A device and method for controlling an output power level in a mobile communication terminal. The device includes an RSSI detector for detecting a strength of a signal received from a base station, and a controller having a memory for storing bias voltage control values and bias current control values corresponding to strengths of received signals, wherein the controller reads the corresponding bias voltage control value and bias current control value in response to the detected signal strength and supplies the read values to a power amplifier.

12 Claims, 4 Drawing Sheets

DEVICE AND METHOD FOR CONTROLLING OUTPUT POWER OF MOBILE COMMUNICATION TERMINAL

BACKGROUND OF THE INVENTION

1. Field of the Invention

The present invention relates generally to mobile communication systems, and more particularly, to a device and method for minimizing the power consumption in a mobile communication terminal by controlling the bias voltage/current of a radio frequency power amplifier.

2. Description of the Related Art

In a mobile communication terminal, the linear characteristic and power consumption represent the primary focus of concern in the design of a power amplifier. That is, the power amplifier is designed in consideration of the power efficiency and linearity at the maximum RF (Radio Frequency) output. A class AB power amplifier is generally used to satisfy the dual requirements of maximum power efficiency and linearity. A corresponding impedance matching and bias state for each amplification stage is then determined. However, the mobile communication terminal is not always driven at the maximum output, and its transmitting output may vary according to a distance from a base station and its velocity. For distances closer to the base station, the transmitting power of the mobile communication terminal is reduced. By contrast, if the mobile communication terminal is further from the base station while still being situated within a radius of a cell or its velocity increases, an RF output approximating the maximum output of the amplifier is transmitted.

FIG. 1 is a block diagram illustrating a conventional power amplifier to which a fixed bias voltage and current are supplied to obtain the maximum output of a mobile communication terminal.

Referring to FIG. 1, amplifiers 101 and 102 amplify an input RF signal according to an input bias voltage and bias current each having a fixed value. A power supply 103 supplies the fixed bias voltage to the amplifiers 101 and 102. A current controller 104 supplies the fixed bias current to the amplifiers 101 and 102.

The power amplifier constructed in the manner described above operates by a fixed bias voltage and bias current. However, such a power amplifier exhibits a remarkably reduced power added efficiency (P.A.E., that is, the ratio of an AC output power minus an AC input power to a DC power of the power amplifier) at its low power output level, as indicated by the graph of FIG. 6. The graph illustrates P.A.E. where the bias voltage and bias current are fixed at prescribed values to obtain the maximum RF output. The graph illustrates that unnecessary DC power is consumed because the class AB power amplifier which normally operates around the maximum output level operates in class A mode as the output level decreases. One proposed method for solving this problem is to selectively drive a power amplifiers connected either in series or in parallel. parallel.

FIG. 2 is a block diagram illustrating another conventional power amplifier in which amplifiers are connected in parallel. In FIG. 2, amplifiers connected in parallel are switched according to a desired output level (i.e., high or low).

Referring to FIG. 2, an RSSI(Received Signal Strength Indication) detector 206 detects a strength of a signal received from a base station (not shown) and informs a controller 205 of the detected signal strength. The controller 205 controls switches 201 and 207 to activate a corresponding amplifier according to the output of the RSSI detector 206 and further controls a power supply 208 to supply power to the activated amplifier. The switches 201 and 207 switch an input RF signal to amplifiers 202 and 203 or amplifier 204 under the control of the controller 205. The power supply 208 supplies a fixed voltage to either the amplifier 202 and 203 or the amplifier 204. The non-selected amplifiers(i.e., 202, 203 or 204) will have its voltage cut off. The amplifiers 202, 203 and 204 are used to pair amplify the input RF signal.

In operation, the RSSI detector 206 detects the strength of a received signal. If the detected signal strength is greater than a prescribed level, the controller 205 controls the switches 201 and 207 to amplify the input RF signal through the amplifier 204 having a low output level and to output the amplified signal to an output RF terminal RFout, and simultaneously sets a variable power voltage Va1 to 0 volts. If the detected signal strength is less than a prescribed level, the controller 205 controls the switches 201 and 207 to amplify the input RF signal through the amplifiers 202 and 203 having a high output level and to output the amplified signal to the output RF terminal RFout, and simultaneously sets a variable power voltage Va2 to 0 volts. Namely, for a low output level, the amplifier which dissipates a low DC power is used to suppress unnecessary power dissipation by cutting off a power supplied to the amplifier necessary for a high DC power.

A switching method for serially connected amplifiers is similar to the parallel switching method described and will therefore not be described in detail herein. In brief, DC power consumption can be reduced for a low output level by cutting off a bias voltage supplied to an output terminal amplifier in serially connected amplifiers. Here, an RF signal is amplified at a front terminal, switched at the output terminal amplifier and bypassed to an output RF terminal RFout.

The above switching methods do not provide a complete solution as they suffer from the following problems. First, cost rises and volume increases due to an additional amplifier connected in parallel. Furthermore, it is difficult to optimize the efficiency of the amplifier due to the fixed bias voltage and current. Second, a circuit becomes complicated whenever output levels exceed two. While prior art solutions can increase efficiency to within a limited range, optimizing the efficiency remains difficult.

SUMMARY OF THE INVENTION

It is, therefore, an object of the present invention to provide an apparatus and method for minimizing the power consumption of a mobile communication terminal by controlling a bias current and bias voltage according to a desired transmitting output power level.

To achieve the above object of the present invention, a device for controlling an output power level in a mobile communication terminal for transmitting an RF signal amplified by a power amplifier through an antenna and receiving a signal from a base station through the antenna, includes an RSSI detector for detecting a strength of a signal received from the base station, and a controller having a memory for storing bias voltage control values and bias current control values corresponding to strengths of received signals, wherein the controller reads the corresponding bias voltage control value and bias current control value in response to the detected signal strength and supplies the read values to the power amplifier as control signals.

In another aspect of the present invention, there is provided a method for controlling an output power level in a mobile communication terminal having a memory for storing bias voltage control values and bias current control values corresponding to strengths of received signals, a power amplifier for amplifying an RF signal, and an antenna for transmitting the RF signal power-amplified by the power amplifier and receiving a signal from a base station. The method includes the steps of detecting a strength of a signal received from the base station, reading the corresponding bias voltage control value and bias current control value from the memory in response to the detected signal strength, and supplying the read bias voltage control value and bias current control value to the power amplifier.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known constructions or functions are not described in detail so as not to obscure the present invention.

In general, when amplifiers are connected in series or parallel for a switching output according to a desired output power level, it is difficult to construct a circuit for controlling powers exceeding two levels. Actually, a dissipated power can be saved only at a few power levels. In other words, if the output power levels at which efficiency is improved are limited or restricted in some way, power consumption efficiency can not be optimized.

If it is possible to vary a minimum DC bias power within the range of continuous linearity along all areas at which output power levels are varied, the consumption of a DC power may be minimized. To this, the characteristics of a power amplifier should be accurately understood and appropriate control should be considered.

Satisfying the above requirements, that is, if the bias voltage and bias current can be changed to a voltage and current for maximizing efficiency, the power consumption efficiency can be optimized without the need for switching. Generally, a S parameter of a transistor is not sensitive to a change of a bias state. This means that the maximum output at the changed bias state and matching impedance for linearity are not greatly changed. The present invention is directed to a control method for minimizing a DC power based on a received signal level. The present invention provides a method for controlling a bias voltage and bias current supplied to the power amplifier according to a desired output power level of the transmitter.

Figure 1:
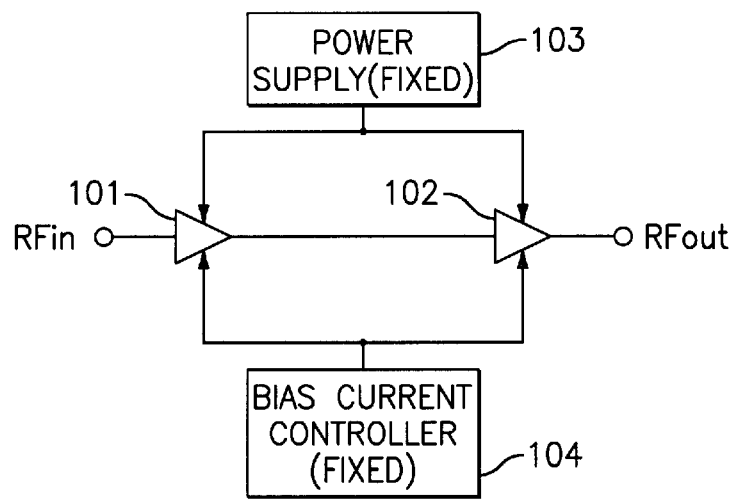
FIG. 1 is a block diagram illustrating a conventional power amplifier configuration whereby a fixed bias voltage and current are supplied to obtain the maximum output of a mobile communication terminal.
Figure 2:
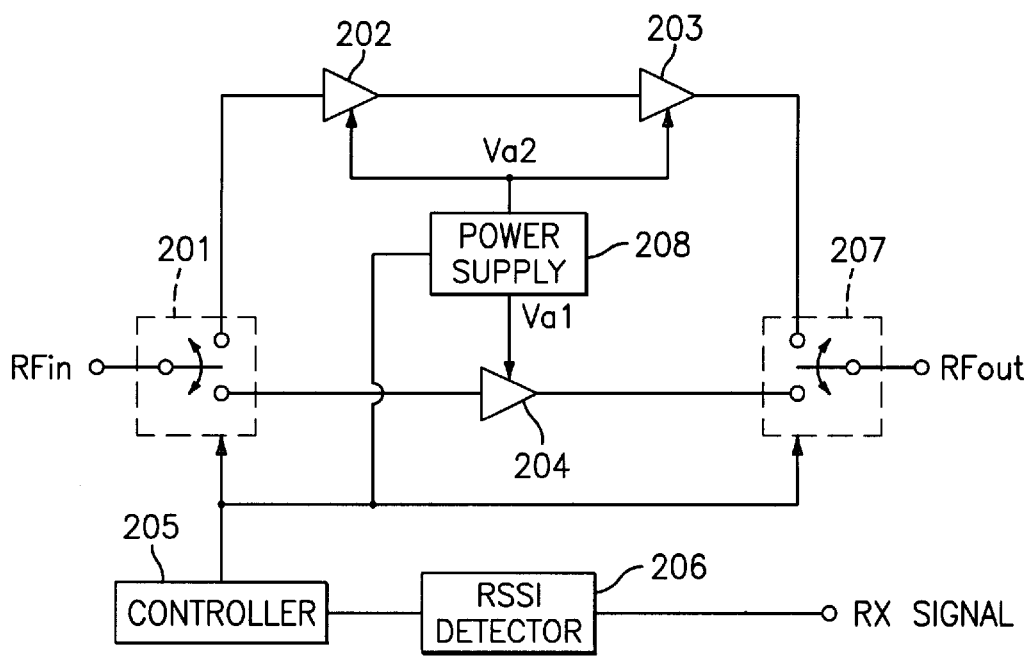
FIG. 2 is a block diagram illustrating another conventional power amplifier configuration in which amplifiers are connected in parallel.
Figure 3:
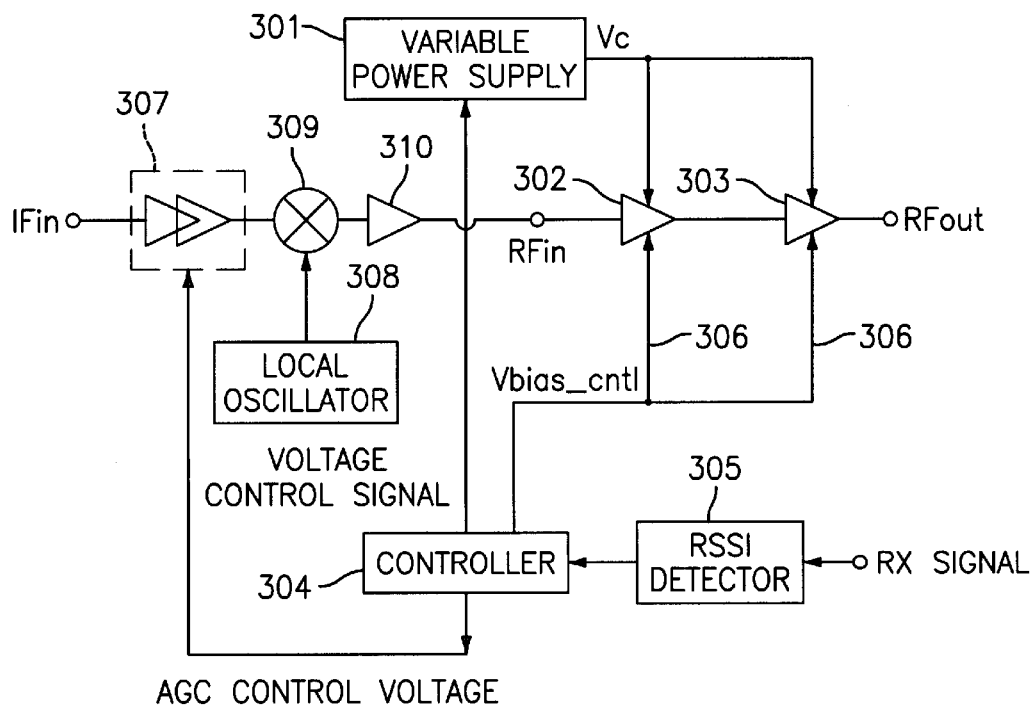
FIG. 3 is a block diagram illustrating a power control device for continuously controlling a bias voltage and bias current to obtain maximum efficiency with respect to output levels according to an embodiment of the present invention.

A controller 304 shown in FIG. 3 in accordance with the present invention includes a memory for storing values needed to minimize the DC power consumption of a power amplifiers 302 and 303. That is, the memory stores bias voltage control values, bias current control values, and automatic gain control (AGC) values of an AGC amplifier to obtain a transmitting signal having an optimal output power level in response to the strength of a received signal. The bias voltage control values, bias current control values and AGC values are determined by experiment and they may be expressed as voltage values as indicated by a graph in FIG. 5.

Referring to FIG. 3, there is shown a power control device for continuously controlling a bias voltage and bias current to obtain maximum power efficiency according to a desired transmitter output power level in a mobile communication terminal.

In the power control device of FIG. 3, an antenna (not shown) receives a signal transmitted from a base station or transmits a power-amplified RF signal (i.e., transmitting signal) to the base station. An RSSI detector 305 detects a strength of a signal received from the base station and informs the controller 304 of the detected signal strength. The controller 304 reads the bias voltage control value, bias current control value and AGC value stored in its internal memory according to the signal strength informed by the RSSI detector 305 and supplies those values to a corresponding element. The bias voltage control value and bias current control value are used to control a bias voltage and bias current demanded by power amplifiers 302 and 303. That is, it can be said that a power level of last output stage (RFout) is determined by a power gain of the power amplifiers 302 and 303 controlled by the bias current control value and the bias voltage control value, and by the power gain of AGC amplifier 307 controlled by the automatic gain control value. Accordingly, the bias voltage control value and the bias current control value are used as a control value for controlling optimal bias voltage and the bias current required in the power amplifiers 302 and 303. And, the AGC value is a control value for controlling the power gain of the AGC amplifier 307 for obtaining the power level required in the last output stage (Rfout). At this time, the AGC value should be determined on basis of the power gain of the power amplifier 302 and 303 varied by the bias voltage control value and the bias current control value. To use those control values as a form of voltage values, the controller 304 should include a configuration for generating the voltage values internally or separately. The controller 304 may be included in a mobile station modem (MSM) or use an additional ASIC circuit. A variable power supply 301 is controlled by the bias voltage control value supplied from the controller 304 and supplies a bias voltage to the amplifiers 302 and 303 so as to maximize their power efficiency. The AGC amplifier 307 is controlled by the AGC value supplied from the controller 304 and controls a gain of an input IF (Intermediate Frequency) signal. A local oscillator 308 generates a carrier wave to be supplied to a frequency converter 309. The frequency converter 309 multiplies the output of the AGC amplifier 307 by the carrier wave output from the local oscillator 308 to output an up-converted RF signal. A driving amplifier 310 amplifies the RF signal output from the frequency converter 309. The power amplifiers 302 and 303 amplify the RF signal output from the driving amplifier 310 according to a bias voltage output from the variable power supply 301 and a bias current determined by a bias current control value output from the controller 304, thereby outputting a transmitting signal (i.e., RF output signal) having a wanted output power level. This is possible because the bias voltage and bias current of the power amplifiers 302 and 303 are controlled by the experimental bias voltage control values and bias current control values stored in the memory of the controller 304. A technique for controlling the bias current by the bias current control value is known to one skilled in the art and thus no further description will be given.

Therefore, the power control device according to the present invention optimizes the power efficiency of the power amplifiers 302 and 303 by the bias voltage control value and bias current control value corresponding to the detected strength of the received signal and controls the gain of the AGC amplifier 307 by the AGC value corresponding to the detected strength of the received signal.

Figure 4:
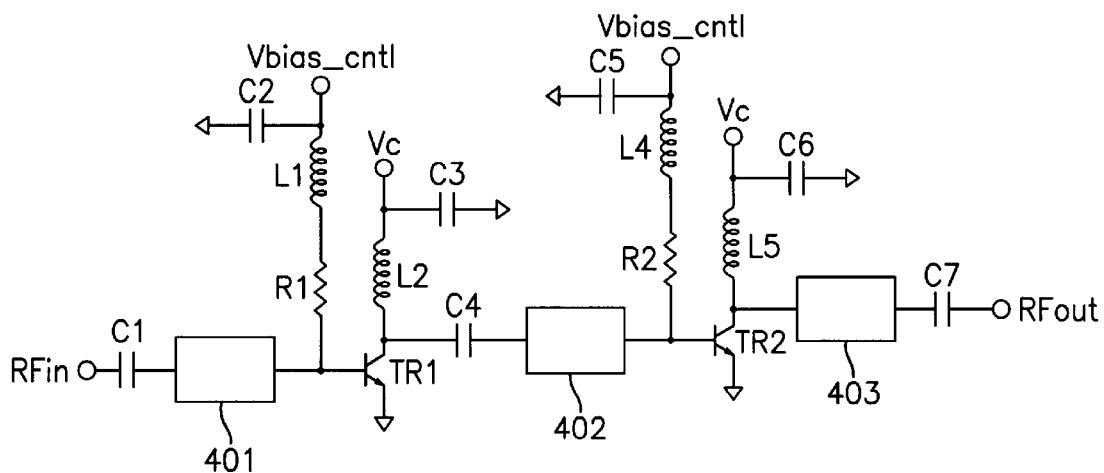
FIG. 4 is a detailed circuit diagram of the power amplifiers shown in FIG. 3.

The detailed configuration of the power amplifiers 302 and 303 is shown in FIG. 4.

Referring to FIG. 4, an input RF terminal RFin is connected to the base of a first transistor TR1 via a capacitor C1 and an input terminal matching circuit 401 which are serially connected to each other. The capacitor C1 couples an input signal and the input terminal matching circuit 401 matches an impedance between the input terminal RFin and the first transistor TR1. A bias current control voltage Vbias_cntl terminal is connected to the base of the first transistor TR1 via an inductance L1 and resistor R1 which are serially connected to each other. A capacitor C2 is connected between the bias current control voltage Vbias_cntl terminal and a ground. The capacitor C2 is for eliminating power noise. The inductance L1 is an RF choke element and the resistor R1 is a current limiting element. A control voltage terminal, for applying a bias voltage Vc, is connected to the collector of the first transistor TR1 via an inductance L2. A capacitor C3 is connected between the bias voltage control voltage terminal and the ground. The capacitor C3 is for eliminating power noise. The inductance L2 is an RF choke element. The emitter of the first transistor TR1 is connected to the ground and the collector thereof is connected to the base of a second transistor TR2 via a capacitor C4 and intermediate terminal matching circuit 402 which are serially connected to each other. The capacitor C4 is for coupling the output signal of the first transistor TR1 and the intermediate terminal matching circuit 402 is for matching an impedance between the output terminal of the first transistor TR1 and the input terminal of the second transistor TR1. A bias current control voltage Vbias_cntl terminal is connected to the base of the second transistor TR2 via an inductance L4 and resistor R2 which are serially connected to each other. A capacitor C5 is connected between the bias current control voltage Vbias_cntl terminal and the ground. The capacitor C5 is for eliminating power noise. The inductance L5 is an RF choke element and the resistor R2 is a current limiting element. A bias voltage Vc is applied at a bias control voltage terminal to the collector of the second transistor TR2 via an inductance L5. A capacitor C6 is connected between the bias voltage control terminal and the ground. The capacitor C6 is for eliminating power noise. The inductance L5 is an RF choke element. The emitter of the second transistor TR2 is connected to ground and the collector thereof is connected to an output RF terminal, RFout via an output terminal matching circuit 403 and capacitor C7 which are serially connected to each other. The output terminal matching circuit 403 is for matching an impedance between the second transistor TR2 and the output terminal RFout. The capacitor C7 is for coupling the output signal of the output terminal matching circuit 403.

In FIG. 4, the bias voltage Vc output from the variable power supply 301 is supplied to each collector (or drain if FETs are used) of the first and second transistors TR1 and TR2, and the bias current control voltage Vbias_cntl is applied as an analog signal to each base (or gate if the FETs are used) thereof from the controller 304. However, a corresponding bias voltage may be applied to each base (or gate) of the transistors TR1 and TR2 from the variable power supply 301 under the control of the controller 304 to supply the bias current control voltage Vbias_cntl.

The operation of the power control device for continuously controlling a bias voltage and bias current according to a desired transmitting output power level will now be described with reference to FIGS. 3 and 4.

Referring again to FIG. 3, a signal transmitted from the base station is supplied to the RSSI detector 305 through an antenna (not shown). The RSSI detector 305 detects a strength of the signal received through the antenna and informs the controller 304 of the detected signal strength. The controller 304 then reads the bias voltage control value and bias current control value for maximum power efficiency from its internal memory in response to the detected signal strength.

Figure 5:
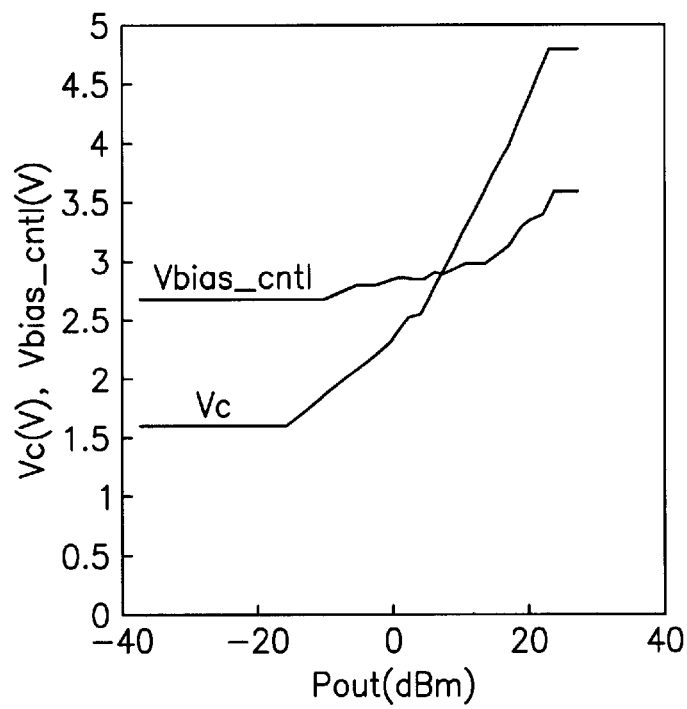
FIG. 5 is a graph of a bias voltage and bias current control voltage as a function of transmitting power level to obtain maximum efficiency in accordance with the present invention.

The read bias voltage control value is supplied to the variable power supply 301 so that the bias voltage output therefrom can be supplied to the collector (or drain) of the power amplifiers 302 and 303. The read bias current control value is supplied to the base(or gate) so that the current can be controlled by the bias current control value. That is, the controller 304 supplies the bias voltage control value and bias current control value to the variable power supply 301 and a base bias control terminal 306, respectively, so that the bias voltage and bias current control voltage shown in FIG. 5 are supplied to the amplifiers 302 and 303. The bias voltage is directly supplied as a collector (or drain) voltage control signal to the collector of each of the transistors TR1 and TR2 from the variable power supply 301. The bias current is controlled by varying current flowing into each transistor according to a voltage of the bias current control value applied to base (or gate).

The correspondence between the bias voltage and bias current control voltage shown in FIG. 5 and the desired transmitter output level is stored in the memory of the controller 304 as data or programmed as a function. Namely, FIG. 5 illustrates the relationship between a transmitting power level Pout of a transmitting signal (i.e., output RF signal) demanded by the signal strength detected by the RSSI detector 305 and the bias voltage control value and bias current control value for obtaining maximum efficiency. The bias voltage control value and bias current control value are control values necessary for maximum efficiency of the transmitting power level determined by experiment. Therefore, the bias voltage control value and bias current control value are determined by experiment by the strength of the received signal and stored in the memory of the controller 304.

There is demanded an operation for compensating for a gain varied by the control of the power amplifiers 302 and 303. For this, the controller 304 supplies a corresponding control voltage (i.e., AGC value) to the AGC amplifier 307. The AGC value is also read from the memory of the controller 304 according to the detected signal strength.

Figure 8:
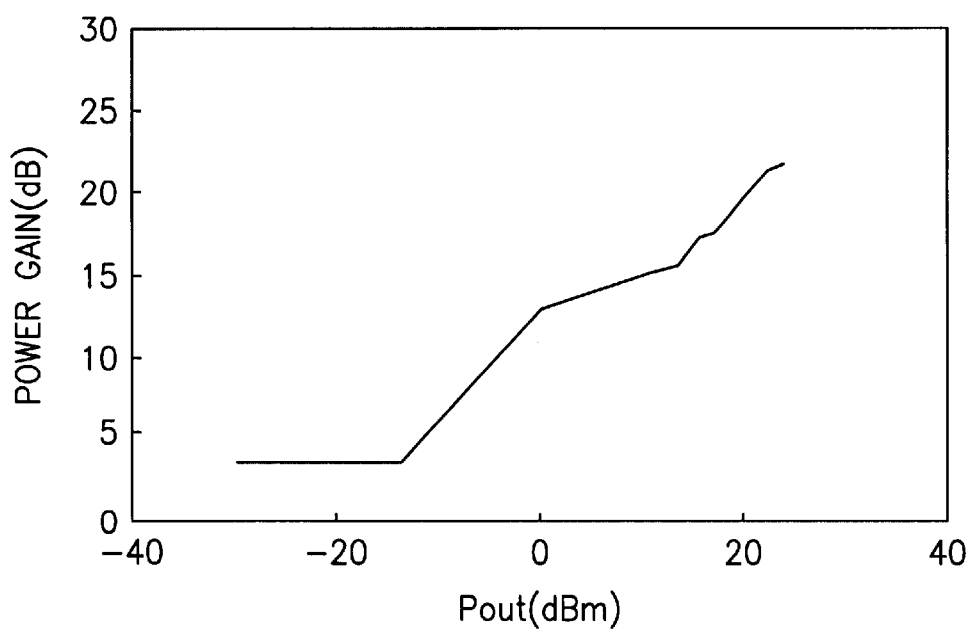
FIG. 8 is a graph illustrating a power gain as a function of transmitting power output level utilizing variable bias control in accordance with the present invention.

To compensate for a change in a gain of the power amplifiers 302 and 303 according to the desired transmitting output level, information about the AGC amplifier control voltage is stored in the memory of the controller 304 as data or programmed as a function in consideration of a characteristic of a power gain shown in FIG. 8. That is, to obtain maximum efficiency according to the power level of the transmitting signal, the gain of the power amplifiers 302 and 303 generated by reducing the bias current and bias voltage is compensated for in the AGC amplifier 307. For example, if the power level of the transmitting signal is changed to 10 dBm from 20 dBm, the power gain is decremeted by 4 dBm from 20 dBm to 16 dBm as indicated in FIG. 8. Assuming that an input level of the AGC amplifier 307 is fixed at −10 dBm and the gain of the frequency converter 309 is 0 dBm, the gain of the AGC amplifier 307 should be decreased by 4 dBm from 10 dBm at the output level of 20 dBm. Meanwhile, the AGC values for controlling the AGC amplifier 307 are stored in the memory of the controller 304. Thus the AGC value for controlling the AGC amplifier 307 is determined according to the output level of the power amplifiers 302 and 303 and stored in the memory of the controller 304.

Therefore, the AGC amplifier 307 controls a gain of the input IF signal according to the control voltage supplied from the controller 304. The frequency converter 309 multiplies the output signal of the AGC amplifier 307 by the carrier wave provided from the local oscillator 308 to output an up-converted RF signal. The driving amplifier 310 amplifies the up-converted RF signal to a level demanded at an input RF terminal, RFin of the power amplifier 302. The power amplifiers 302 and 303 amplify the input RF signal to a desired output level according to the bias voltage supplied from the variable power supply 301 to the collector (or drain) and the bias current controlled by the bias current control value supplied from the controller 304 to the base (or gate), and output the amplified signal through the output RF terminal RFout. The RF signal output through the output RF terminal RFout is transmitted to the base station through the antenna.

Figure 6:
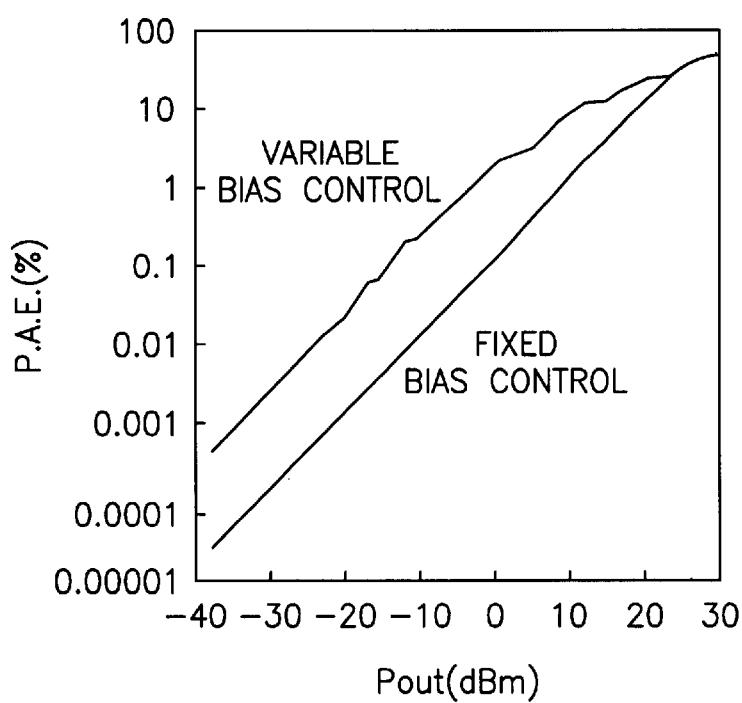
FIG. 6 is a graph of a power added efficiency (P.A.E.) as a function of transmitting power output level for both conventional fixed bias control and variable bias control in accordance with the present invention.
Figure 7:
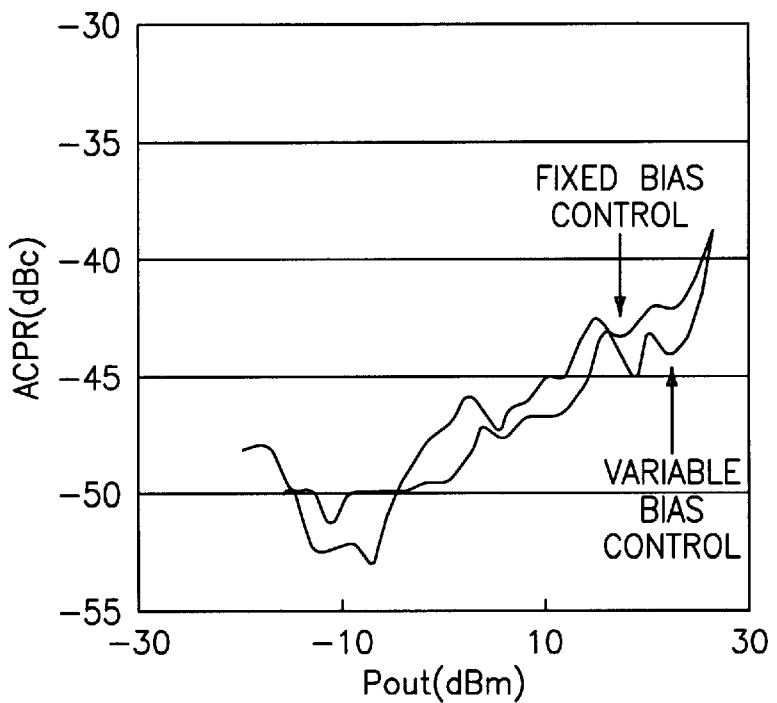
FIG. 7 is a graph illustrating adjacent channel power rejection (ACPR) as a function of transmitting power output level for both conventional fixed bias control and variable bias control in accordance with the present invention.

FIGS. 6 and 7 illustrate a power added efficiency (P.A.E.) graph and an adjacent channel power rejection (ACPR; In-band channel power/adjacent channel power) graph, respectively, as a function of a desired transmitter output power level. Each graph illustrates two curves, one a conventional fixed bias control curve and a bias control curve in accordance with the present invention.

Referring initially to FIG. 6, the power added efficiency (P.A.E.) of the inventive variable bias control is improved by 10 times when the output level Pout is less than 0 dBm; by 6–8 times when it is between 0 dBm and 10 dBm; and by 2–4 times when it is between 10 dBm and 20 dBm, as compared with the conventional fixed bias control. The ACPR does not show great variations as indicated in FIG. 7.

The power gain as a function of the output level of the power amplifier 32 is indicated in FIG. 8.

Referring to FIG. 8, the power gain at the minimum output level is 4 dB and the power gain at the maximum output level is 23 dB. As shown, the gains at levels between the minimum and maximum output levels gradually increase or decrease in proportion to the output levels. This gain characteristic differs from a conventional amplifier which exhibits a uniform gain. The gain variation of the power amplifier is compensated for by controlling the gain of the AGC amplifier 307. That is, if the gain of the power amplifier decreases, the controller 304 increments the gain of the AGC amplifier 307 to raise the output level of the AGC amplifier 307 according to the input IF signal. The amplified IF signal is converted into the RF signal having a desired output level through the frequency converter 309 and the driving amplifier 310 and supplied to the input terminal RFin of the power amplifier 302.

Consequently, since the bias voltage and bias current are controlled according to the output level of the power amplifier, the linearity of the power amplifier is maintained and the DC power consumption is minimized. The inventive power control device preferably operates under the following conditions. First, a unique linear characteristic (for example, ACPR, IMD3 ($3_{rd}$ order Intermodulation Distortion)) of the power amplifier is maintained. Second, avoid abrupt variations in the bias current and bias voltage. The bias voltage and bias current are selected within the range where the current control signal Vbias_cntl and the driving voltage Vc linearly vary according to the output level and the bias current and bias voltage gradually vary, thereby easily and reliably controlling the voltage and current according to the output level. If there is abrupt variations in the bias voltage and bias current, the power amplifier may lead to a malfunction in an excessive bias state. Third, maximize the P.A.E. when the above two conditions are satisfied.

As may be apparent from the aforementioned description, since the power amplifier of a mobile communication terminal is controlled such that the bias voltage and bias current maintain linearity even at a low output level and efficiency is improved, the power consumption of a battery is saved and time which can use the terminal without recharging the battery can be lengthened.

While the invention has been shown and described with reference to a certain preferred embodiment thereof, it will be understood by those skilled in the art that various changes in form and details may be made therein without departing from the spirit and scope of the invention as defined by the appended claims.

What is claimed is:
1. A device for controlling an output power level in a mobile communication terminal for transmitting a radio frequency (RF) signal amplified by a power amplifier through an antenna and receiving a signal from a base station through the antenna, said device comprising:
   a received signal strength indication (RSSI) detector for detecting a strength of a signal received from the base station; and
   a controller having a memory for storing bias voltage control values and bias current control values corresponding to strengths of received signals, wherein the controller reads the corresponding bias voltage control value and bias current control value in response to the detected signal strength and supplies the read values to the power amplifier.

2. The device as claimed in claim 1, wherein the memory stores automatic gain control values corresponding to strengths of received signals, for controlling a gain of an automatic gain control amplifier.

3. The device as claimed in claim 2, further comprising a variable power supply for supplying a variable bias voltage to the power amplifier according to the read bias voltage control value.

4. The device as claimed in claim 3, wherein the bias voltage control values, bias current control values and automatic gain control values are voltage values of prescribed levels.

5. A device for controlling an output power level in a mobile communication terminal having an automatic gain control amplifier for amplifying an input signal in response to an automatic gain control value, a frequency converter for converting a signal amplified by the automatic gain control amplifier into a radio frequency (RF) signal, a power amplifier for amplifying the RF signal received from the frequency converter to output a power-amplified transmitting signal, and an antenna for transmitting the power-amplified transmitting signal and receiving a signal from a base station, said device comprising:

a received signal strength indication (RSSI) detector for detecting a strength of a signal received from the base station; and a controller having a memory for storing automatic gain control values, bias voltage control values and bias current control values corresponding to strengths of received signals, wherein the controller reads the corresponding automatic gain control value, bias voltage control value and bias current control value in response to the detected signal strength, supplies the read automatic gain control value to the automatic gain control amplifier, and supplies the read bias voltage control value and bias current control value to the power amplifier.

6. The device as claimed in claim 5, further comprising a variable power supply for supplying a variable bias voltage to the power amplifier according to the read bias voltage control value.

7. The device as claimed in claim 6, wherein the bias voltage control values, bias current control values and automatic gain control values are voltage values of prescribed levels.

8. A method for controlling an output power level in a mobile communication terminal having a memory for storing bias voltage control values and bias current control values corresponding to strengths of received signals, a power amplifier for amplifying an input radio frequency (RF) signal, and an antenna for transmitting the RF signal power-amplified by the power amplifier and receiving a signal from a base station, said method comprising the steps of:

detecting a strength of a signal received from the base station;

reading the corresponding bias voltage control value and bias current control value from the memory in response to the detected signal strength; and supplying the read bias voltage control value and bias current control value to the power amplifier.

9. The method as claimed in claim 8, further comprising the step of storing automatic gain control values corresponding to strengths of received signals in the memory and reading the corresponding automatic gain control value in response to the detected signal strength to supply the read automatic gain control value to the automatic gain control amplifier.

10. The method as claimed in claim 9, further comprising the step of supplying a variable bias voltage to the power amplifier according to the read bias voltage control value.

11. A method for controlling an output power level in a mobile communication terminal having an automatic gain control amplifier for amplifying an input signal in response to an automatic gain control value, a frequency converter for converting a signal amplified by the automatic gain control amplifier into a radio frequency (RF) signal, a power amplifier for amplifying the RF signal received from the frequency converter to output a power-amplified transmitting signal, and an antenna for transmitting the power-amplified transmitting signal and receiving a signal from a base station, said method comprising the steps of:

detecting a strength of a signal received from the base station;

reading the corresponding bias voltage control value, bias current control value and automatic gain control value from the memory in response to the detected signal strength;

supplying the read bias voltage control value and bias current control value to the power amplifier; and supplying the read automatic gain control value to the automatic gain control amplifier.

12. The method as claimed in claim 11, further comprising the step of supplying a variable bias voltage to the power amplifier according to the read bias voltage control value.

* * * * *